June 2, 1925.                G. K. DAWSON ET AL                1,540,608
                             STEERING ATTACHMENT
                             Filed July 16, 1924

WITNESSES                                    INVENTORS
                                       George K. Dawson and
                                       Horace R. Luce,
                                            BY
                                                  ATTORNEYS Patented June 2, 1925.

1,540,608

UNITED STATES PATENT OFFICE.

GEORGE K. DAWSON AND HORACE RILEY LUCE, OF SAN BERNARDINO, CALIFORNIA.

STEERING ATTACHMENT.

Application filed July 16, 1924. Serial No. 726,364.

*To all whom it may concern:*

Be it known that we, GEORGE K. DAWSON and HORACE R. LUCE, citizens of the United States, and residents of San Bernardino, in the county of San Bernardino and State of California, have invented certain new and useful Improvements in Steering Attachments, of which the following is a specification.

This invention relates to automobiles and is more particularly directed to a steering apparatus used in connection with the usual steering wheel.

An object of the invention is the provision of a device adapted to connect the usual steering gear with a foot pedal whereby the automobile may be steered to the operation of such pedal to relieve the operator of the car from constant application to the steering wheel.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claim.

Figure 1:
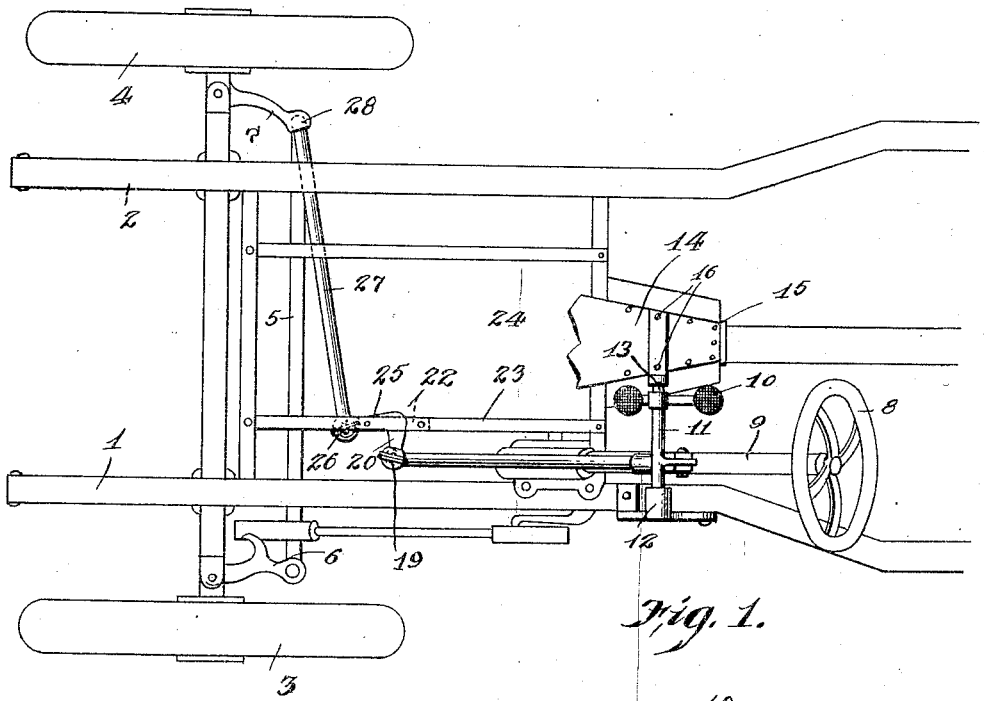
Figure 1 is a plan view of the chassis of an automobile showing our auxiliary steering device applied thereto.
Figure 2:
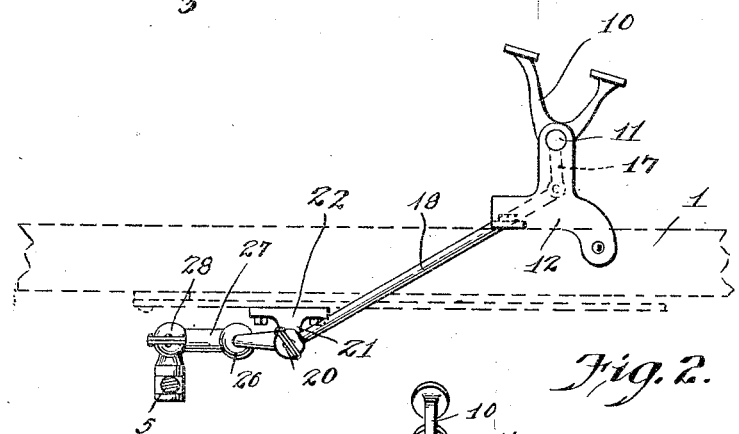
Figure 2 is a fragmentary side view of the auxiliary steering device.
Figure 3:
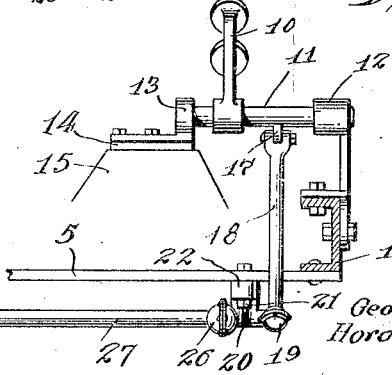
Figure 3 is a front view of the same.

Referring more particularly to the drawings, 1 and 2 designate the side rails of the frame of the automobile, 3 and 4 the front wheels, 5 the transverse steering rod, and 6 and 7 the steering knuckles of the steering gear, all such parts being well known in the art. The automobile is normally steered through a steering wheel 8 rigid with a steering post whereby actuation of the steering wheel causes operation of the post. The lower end of the post is connected by means of a link with one end of the steering connecting rod 5 so that as the rod 5 is shifted the knuckles 6 and 7 are likewise oscillated for turning the wheels 3 and 4 in the direction desired.

Within easy reach of the foot of the operator of the car and below the dash is rockably mounted a foot pedal 10. This foot pedal is rigid with a shaft 11 mounted in a bearing 12 secured to the beam 1 and a bearing 13 secured to the cover plate 14 of the transmission housing 15. In this case the bolts which normally secure the transmission cover 14 to the transmission casing at this point are removed and other bolts 16 are screwed into the threaded openings of the casing for not only aiding in securing the cover 14 in position but for securing the bearing 13 against the cover 14.

Projecting below the shaft 11 and rigid with the foot pedal 10 is a depending arm 17. The free end of said arm is pivotally connected by means of a yoke with a link 18. The other end 19 of the link is connected with one arm 20 of a bell crank lever which is pivotally mounted at 21 upon a bracket 22 which is secured to the projecting flange 23 of the crank case 24 of the engine. The other arm 25 of the bell crank lever has a pawl and socket connection 26 with a link 27. The other end of the link is likewise provided with a pawl and socket joint 28 which connects with the outer free end of the knuckle 7.

It will be seen that by oscillation of the pedal 10 forwardly the arm 17 will be moved rearwardly shifting link 18 rearwardly and likewise oscillating the bell crank lever on its pivotal point 21 so that the arm 27 is shifted towards the left side of the automobile. When such action occurs the wheels 3 and 4 are turned towards the right for making a right turn. A reverse movement of the lever 10 will cause the automobile to turn to the left.

It will be seen by our improved construction that any time the operator of the car desires he may relieve the strain upon himself due to long drives by actuating the foot pedal for steering the automobile.

What we claim is:

In an automobile having a transmission casing and a cover bolted to said casing, the combination with the steering gear of an automobile including a steering knuckle, of a rock shaft, brackets connected with the frame of the automobile and the cover plate of the transmission for removably supporting said shaft, a pedal rigid with said shaft for rocking the same, an arm rigid with said shaft and projecting downwardly from the same, a bell crank lever pivoted to the frame, a link connecting one arm of the bell crank lever with the arm on the shaft, a rod, and a universal joint connecting the ends of the rod respectively with the steering knuckle of the steering gear and with the other arm of the bell crank lever.

GEORGE K. DAWSON.
HORACE RILEY LUCE.